May 4, 1965   E. P. BUSILLO   3,181,358
FLOWMETER
Filed Oct. 12, 1962   2 Sheets-Sheet 1

May 4, 1965

E. P. BUSILLO 3,181,358

FLOWMETER

Filed Oct. 12, 1962

United States Patent Office 3,181,358
Patented May 4, 1965

3,181,358
FLOWMETER
Eugene P. Busillo, Huntingdon Valley, Pa., assignor to Fischer & Porter Company, Warminster, Pa., a corporation of Pennsylvania
Filed Oct. 12, 1962, Ser. No. 230,037
6 Claims. (Cl. 73—209)

This invention relates to flowmeters of the variable area type, and particularly to a flowmeter of this type in which the metering tube is secured for ready removability and is sealed in position either by O-rings or by means of a packing gland, depending upon requirements.

In my prior application Serial No. 168,120, filed January 23, 1962, there is disclosed a flowmeter of simple and inexpensive construction involving, particularly, a readily assembled frame for the mounting of the fittings and metering tubes. In brief, the frame has a simple construction, comprising elements which may be readily sawed from aluminum or similar extrusions and which are very easily assembled. The main portion of the frame comprises a length of an extrusion cut to suit the particular size of flowmeter involved. with which there are then assembled, merely by sliding movements, a pair of cut lengths of another extrusion. As disclosed, the metering tube is sealed and held in place by the use of O-rings and provision is made for disengagement of the tube from these O-rings so that it may be readily removed and replaced.

The present invention relates to the same general type of flowmeter, but provision is made for sealing the metering tube in place by means of gland-type packings which are desired by some users particularly when high pressures are involved or when, because of the handling of dangerous liquids, the possibility of accidental displacement and removal of the tube must be positively prevented. The arrangement is such, however, that even though gland-type packings are used, the tube may be readily released and removed when desired. For this purpose, advantage is taken of the low friction characteristics of Teflon by providing a packing in which the tube is engaged with Teflon elements so that, upon release of pressure, ready sliding of the tube may take place for its ready removal.

A further object of this invention is the provision of a flowmeter construction made up to a major extent of standard parts which, by replacement of relatively minor parts may involve the alternative possibilities of sealing the tube in position either by means of O-rings or gland type packings.

The foregoing and other objects, particularly relating to details of the invention, will become apparent from the following description, read in conjunction with the accompanying drawings, in which.

Figure 1:
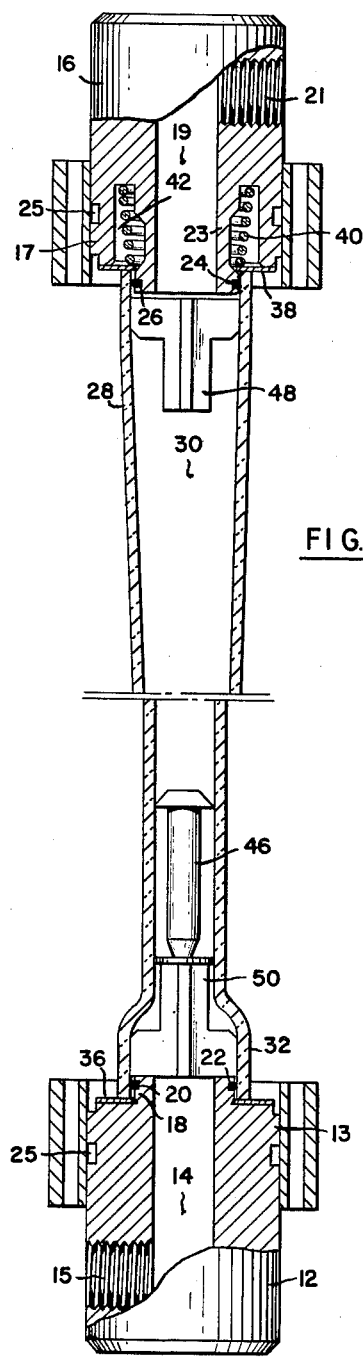
FIGURE 1 is a sectional view showing the assembled flowmeter in a form in which O-ring packing is used.

The frame of the meter is the same in both modifications, and there is indicated at 2 the main portion of the frame of the flowmeter which is simply a length cut from an aluminum or similar extrusion having the cross-section illustrated. The extrusion is provided with a semi-cylindrical socket 3 and at its edges is provided with a groove 4 and a tongue 5, the groove and tongue extending the length of the extrusion. Arranged to be associated with the portion 2 of the frame are a pair of cut lengths 6 and 7 of another extrusion, these being identical so that consideration may be given solely to the upper of these. This last extrustion is also provided with a semi-cylindrical socket 8 having the same radius as the socket 3. At the edge of each of the last named extrusions are the outwardly opening slots 9 and outwardly extending tongue 10. As will be evident from the figures, the described elements may be fitted together by relative sliding movements, the tongue 5 in each case entering the groove 9 and the tongue 10 entering the groove 4. Dimensions are chosen so that a free sliding fit is provided, but by simple burring of the tongues or slight distortion thereof by peening provision is made for a forced fit, the result being that once assembled the elements 2, 6 and 7 retain their assembled positions as illustrated.

An inlet fitting 12 is provided at the bottom of the flowmeter and has a portion 13 for entry into the cylindrical opening which is provided by the sockets 3 and 8. This fitting has a fluid passage 14 extending centrally therethrough and communicating with an opening 15 tapped for the reception of a connecting pipe.

Similarly an outlet fitting 16 is provided having a cylindrical portion 17 entering the cylindrical opening at the top of the frame provided by the sockets 3 and 8. This fitting likewise has a central opening 19 for exit of fluid communicating with the opening 21 tapped to receive an outlet pipe. To retain the fittings against axial movement, each has its cylindrical portion which enters the frame grooved as indicated at 25 to receive a corresponding transverse pin 27 extending through an opening in the frame element 2. This arrangement permits the fitting to be rotated to adjusted positions for convenient attachment to piping. Furthermore, after assembly with the piping is completed, the entire flowmeter may be turned for convenient reading.

The lower fitting 12 is provided with a cylindrical portion 18 of reduced diameter through which the flow passage 14 extends concentrically. At its upper end the portion 18 is provided with an externally facing groove 20 in which an O-ring 22 may be located. In similar fashion the upper fitting 16 is provided with a reduced diameter cylindrical portion 23 circumferentially slotted at 24 to receive an O-ring 26.

The frame and end fittings so far described are standard for both assemblies illustrated and provide construction suitable for both packing arrangements heretofore referred to. The fact that these same parts may be used for both alternative arrangements is of great value from the manufacturing standpoint since parts are thus standardized and may be stocked for the production of both types of flowmeters.

Figure 2:
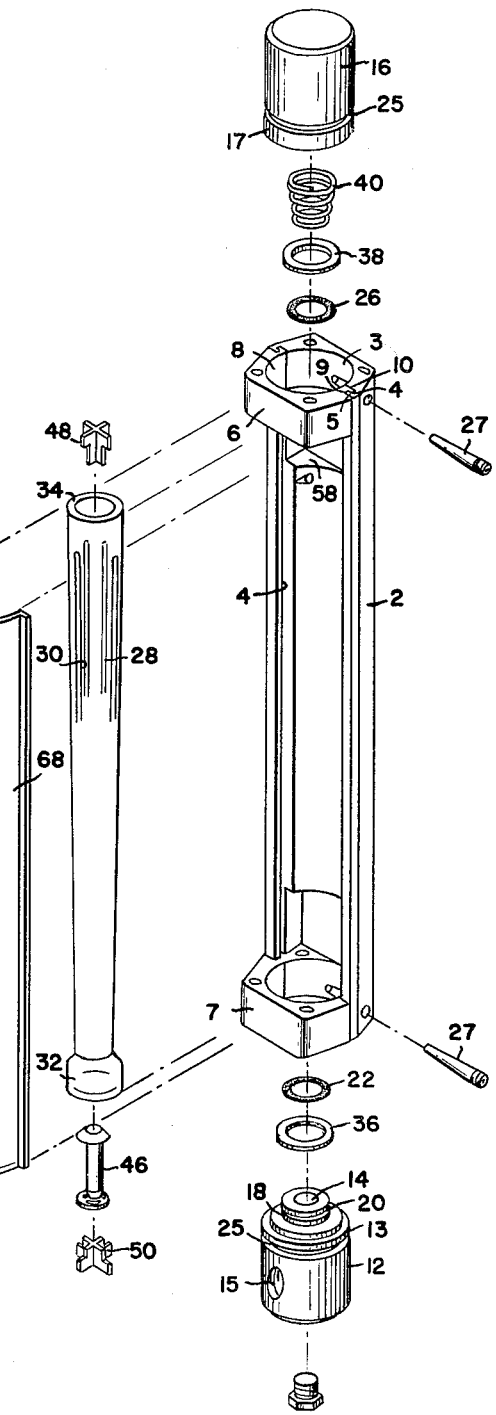
FIGURE 2 is an exploded view making clear the assembly of the parts to provide the construction illustrated in FIGURE 1.

Reference may now be made particularly to FIGURES 1 and 2 showing the arrangement in which O-ring packing is used. The variable area flowmeter tube 28, generally desirably formed of glass and having the usual tapered bore 30 is provided with enlarged cylindrical portions 32 and 34 arranged to embrace the O-rings 22 and 26 to provide fluid-tight seals. The inner diameters of the portions 32 and 34 of the tube are desirably equal so that irrespective of possibly high pressures of the fluid undergoing measurement there will be no substantial force tending to move the tube 28 in either direction. It may be noted that the socket portions 32 and 34 of the tube may be standard for a wide variety of tubes having different tapers of their bores. The tubes 28, if of glass, may be molded on two-part mandrels to provide interior precision. Extreme precision of external dimensions is relatively immaterial though, if the same tubes are to be interchangeably used with O-ring packings or with gland type packings, reasonable standardization of the cylindrical external surfaces is desirable. This, however, may be readily achieved in the molding process.

Desirably, a washer 36 is provided on which the lower end of the tube 28 rests. A similar washer 38 is desirably provided at the upper end of the tube, and this is urged downwardly by a spring 40 in the event that such a spring is used to provide further insurance against possible accidental lengthwise displacement of the tube. This spring 40 is housed within the annular space 42 of the upper fitting 16 which space, as will appear, has also a function in connection with the gland packing arrangement.

The conventional metering float 46 may take any form suitable for the particular uses desired for the flowmeter. Removable float stops are shown at 48 and 50, these being provided to arrest the movements of the float and still maintain flow conditions when the float is in its extreme positions, the stops, accordingly, being of a spider construction to provide free flow passages.

What is presented from an operating standpoint in the O-ring packed arrangement of FIGURES 1 and 2 is essentially what is disclosed in my prior application. The tube is readily removed by manually moving it upwardly, compressing the spring 40 if such a spring is provided. Such upward movement will cause the lower end 32 of the tube to clear the lower O-ring 22 and the end of the reduced portion 18 of the lower fitting. The resilience of the upper O-ring then permits the lower end of the tube to be pulled laterally outwardly whereupon, by downward movement, its upper end may be disengaged from the O-ring 26 so that the tube may be removed. Assembly with another tube is effected by a reverse procedure.

Figure 3:
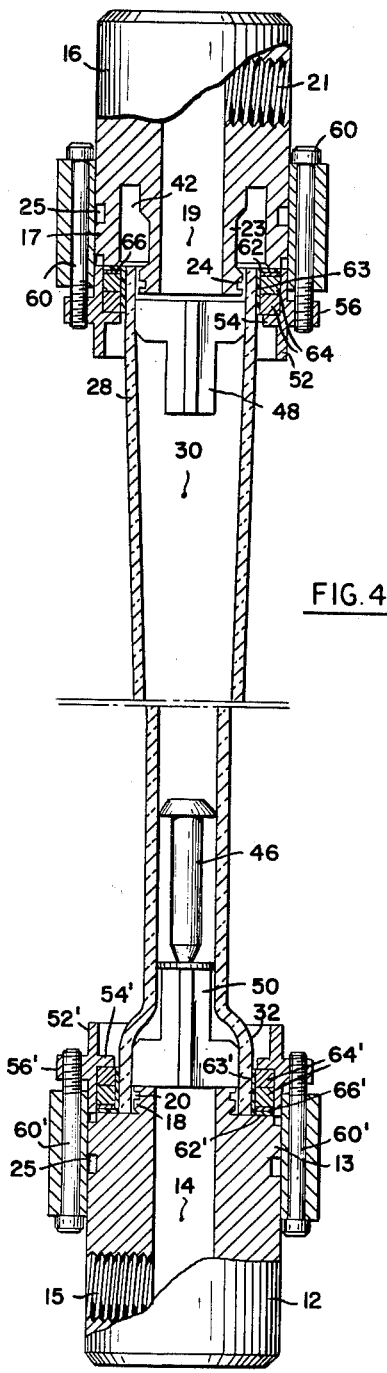
FIGURE 3 is a section similar to FIGURE 1 but showing the same major elements assembled through the use of gland type packings.
Figure 4:
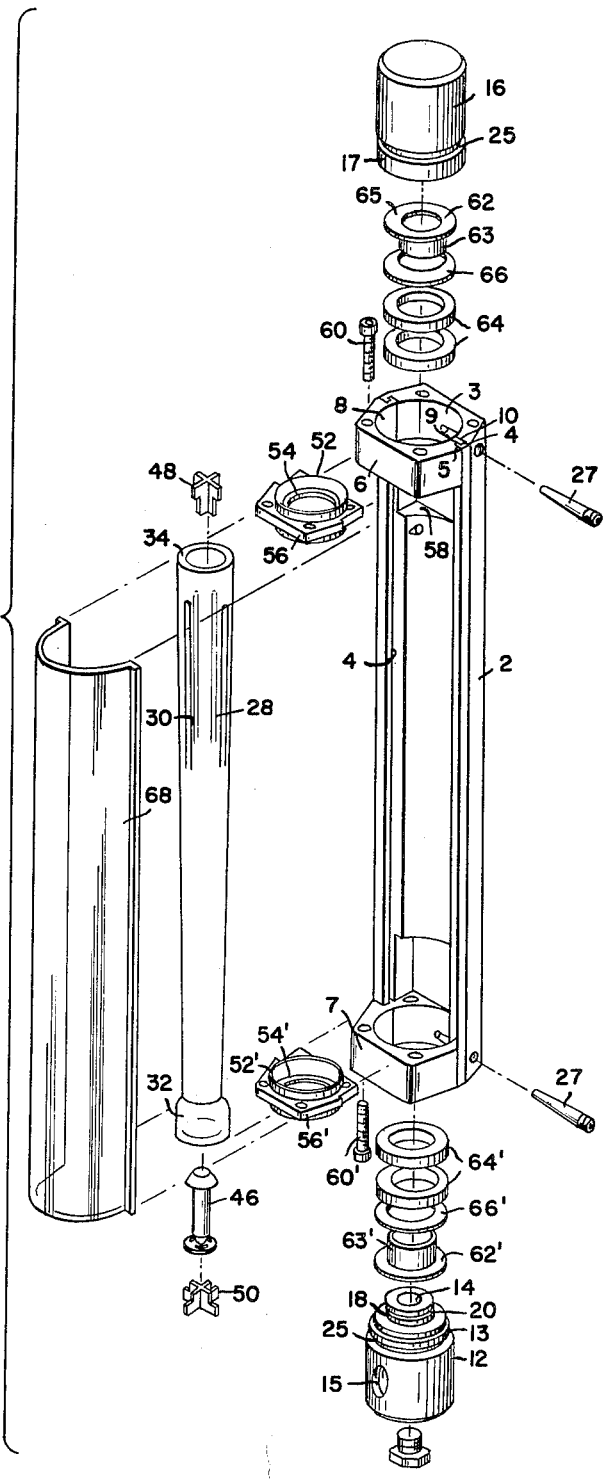
FIGURE 4 is an exploded view similar to FIGURE 2 but showing the parts involved in the meter illustrated in FIGURE 3.

Reference may now be made to FIGURES 3 and 4 illustrating the novel arrangement used in connection with gland-type packing. Since the assembly involved is the same at both the top and the bottom of the flowmeter, reference will be made specifically to the arrangement at the top, the parts at the bottom being designated by the same numerals primed.

A gland 52 has the construction illustrated, having particularly an inwardly directed flange 54 providing a socket for the packing. It also has an outwardly directed flange 56 shaped for reception in a milled-out socket 58 formed in the frame portion 2. Tapped openings are provided for screws 60 which extend through openings formed in the upper portion of the frame portion 2 and the end frame portion 6.

A cylindrical Teflon packing element is shown at 62 and has a cylindrical tubular part 63 and a radial flange 65. Below this, in assembly, is a metallic washer 66, and in turn below this are packing rings 64 which may be formed of any suitable yielding material such as synthetic rubber, or the like. The rings 64 and washer 66 are located, as illustrated, in the socket above the flange 54.

A flexible, transparent, plastic window 68 is adapted to be held in position between extruded members 6 and 7 by virtue of its engagement with grooves 4 in frame 2.

When the tube 28 is in place, its upper and lower ends 34 and 32 are located within the Teflon packing elements 62 and 62' respectively. This is resilient, and when compression is applied to the packing rings 64 the cylindrical portion 63 of the Teflon element 62 is pressed tightly against the outer cylindrical portion of the tube. Since any desired degree of pressure may be effected through the screws 60', tight and reliable seals are thus provided at both ends of the tube.

If it is desired to remove the tube it is only necessary to turn the screws 60' to release the pressure whereupon the tube becomes readily slidable upwardly. The Teflon elements 62 and 62' offer so little frictional resistance as soon as the pressure is relieved that the tube may be easily moved upwardly with its upper end entering the annular space 42. Thereupon the resilience of the upper Teflon element 62 and the packing rings 64 permits the lower end of the tube, released from the lower packing, to be pulled outwardly and thereafter downwardly to effect release of the tube. Replacement is effected by a reverse series of operations, the packings being tightened by manipulation of the screws 60 and 60'.

From the description of FIGURES 3 and 4, it will be evident that there is provided a flowmeter construction in which, despite the gland-type packing, the tube is made very readily removable and replaceable.

It will also be evident that, comparing the two forms, the major elements which are involved may be manufactured in standard form for both modifications. In fact, both may actually be combined, since O-rings may be provided within the grooves 20 and 24 to provide internal O-ring sealing in addition to external gland sealing. This arrangement may be particularly adopted for keeping liquid out of the annular space 42 from which it otherwise might flow during the removal of a tube from the gland-type packing. Thus a dangerous liquid may be prevented from coming in contact with the hands of the person effecting removal.

It will be evident that various changes in details may be made without departing from the invention as defined in the following claims.

What is claimed is:

1. A flowmeter comprising a pair of mounting assemblies, a metering tube, and a flow indicating element within said tube, each of said assemblies including a pair of elements providing an annular socket, packing means within said socket, and means urging said elements towards each other to compress said packing means and urge said means into fluid-tight engagement with the exterior surface of an end of said tube, said packing means including a cylindrical element of Teflon engageable with the tube end, at least one of said assemblies providing a clearance space into which, upon release of compression on the packing means, the corresponding end of the tube may enter by sliding movement relative to said cylindrical element to clear its other end from the corresponding packing means, said cylindrical element being flexible to allow tilting of the tube for removal thereof.

2. A flowmeter comprising a pair of mounting assemblies, a metering tube, and a flow indicating element within said tube, each of said assemblies including a pair of elements providing an annular socket, packing means within said socket, and means urging said elements towards each other to compress said packing means and urge said means into fluid-tight engagement with the exterior surface of an end of said tube, said packing means including a cylindrical element of flexible plastic material engageable with the tube end, at least one of said assemblies providing a clearance space into which, upon release of compression on the packing means, the corresponding end of the tube may enter by sliding movement relative to said cylindrical element to clear its other end from the corresponding packing means, said cylindrical element being flexible to allow tilting of the tube for removal thereof.

3. A flowmeter comprising a pair of mounting assemblies, a metering tube, and a flow indicating element within said tube, each of said assemblies including a pair of elements providing an annular socket, packing means within said socket, and means urging said elements towards each other to compress said packing means and urge said means into fluid-tight engagement with the exterior surface of an end of said tube, said packing means including a cylindrical element of Teflon having a retaining flange and engageable with the tube end, at least one of said assemblies providing a clearance space into which, upon release of compression on the packing means, the corresponding end of the tube may enter by sliding movement relative to said cylindrical element to clear its other end from the corresponding packing means, said cylindrical element being flexible to allow tilting of the tube for removal thereof.

4. A flowmeter comprising a pair of mounting assemblies, a metering tube, and a flow indicating element within said tube, each of said assemblies including a pair of elements providing an annular socket, packing means within said socket, and means urging said elements towards each other to compress said packing means and urge said means into fluid-tight engagement with the exterior surface of an end of said tube, said packing means including a cylindrical element of flexible plastic material having a retaining flange and engageable with the tube end, at least one of said assemblies providing a clearance space into which, upon release of compression on the packing means, the corresponding end of the tube may enter by sliding movement relative to said cylindrical element to clear its other end from the corresponding packing means, said cylindrical element being flexible to allow tilting of the tube for removal thereof.

5. A flowmeter comprising a pair of mounting assemblies, a metering tube, and a flow indicating element within said tube, each of said assemblies including a pair of elements providing an annular socket, packing means within said socket, and means urging said elements towards each other to compress said packing means and urge said means into fluid-tight engagement with the exterior surface of an end of said tube, said packing means including a cylindrical element of Teflon engageable with the tube end, at least one of said assemblies providing a clearance space into which, upon release of compression on the packing means, the corresponding end of the tube may enter by sliding movement relative to said cylindrical element to clear its other end from the corresponding packing means, said cylindrical element being flexible to allow tilting of the tube for removal thereof, each of said mounting assemblies having a portion arranged to enter a corresponding end of said tube and provided with a circumferential groove arranged to receive an O-ring for sealing engagement with the interior of said tube.

6. A flowmeter comprising a pair of mounting assemblies, a metering tube, and a flow indicating element within said tube, each of said assemblies including a pair of elements providing an annular socket, packing means within said socket, and means urging said elements towards each other to compress said packing means and urge said means into fluid-tight engagement with the exterior surface of an end of said tube, said packing means including a cylindrical element of flexible plastic material engageable with the tube end, at least one of said assemblies providing a clearance space into which, upon release of compression on the packing means, the corresponding end of the tube may enter by sliding movement relative to said cylindrical element to clear its other end from the corresponding packing means, said cylindrical element being flexible to allow tilting of the tube for removal thereof, each of said mounting assemblies having a portion arranged to enter a corresponding end of said tube and provided with a circumferential groove arranged to receive an O-ring for sealing engagement with the interior of said tube.

References Cited by the Examiner
UNITED STATES PATENTS

| | | | |
|---|---|---|---|
| 2,370,634 | 3/45 | Brewer | 73—209 |
| 2,755,659 | 7/56 | Boppel | 73—209 X |
| 3,008,330 | 11/61 | Seemar | 73—208 |
| 3,060,739 | 10/62 | Sternberg | 73—209 |

RICHARD C. QUEISSER, *Primary Examiner.*